United States Patent [19]

Jones

[11] 3,967,234

[45] June 29, 1976

[54] DEPTH-OF-FIELD ARC-TRANSDUCER AND SONAR SYSTEM

[75] Inventor: Charles H. Jones, Murrysville, Pa.

[73] Assignee: Westinghouse Electric Corporation, Pittsburgh, Pa.

[22] Filed: Mar. 6, 1974

[21] Appl. No.: 448,596

[52] U.S. Cl. .................................. 340/8 R; 310/9.6; 340/3 R; 340/6 S; 340/9

[51] Int. Cl.$^2$ ........................................... H04B 13/00

[58] Field of Search ............. 340/3 F, 3 R, 6 S, 8 R, 340/9, 10, 12 R; 310/9.6

[56] References Cited

UNITED STATES PATENTS

| | | | |
|---|---|---|---|
| 3,142,032 | 7/1964 | Jones | 340/3 R |
| 3,144,631 | 8/1964 | Lustig et al. | 340/3 F |
| 3,359,537 | 12/1967 | Geil et al. | 340/9 |
| 3,368,190 | 2/1968 | Wilson et al. | 340/6 S |
| 3,381,264 | 4/1968 | Lavergne et al. | 340/3 R |
| 3,585,578 | 6/1971 | Fischer | 340/9 |
| 3,585,579 | 6/1971 | Dorr | 340/9 |
| 3,716,824 | 2/1973 | Dor et al. | 340/3 F |
| 3,760,345 | 9/1973 | Hughes | 340/6 S |

*Primary Examiner*—Harold Tudor
*Attorney, Agent, or Firm*—D. Schron

[57] ABSTRACT

A large depth-of-field arc-transducer for use in sonar systems is provided in which at least one transducer element is positioned to lie along the arc of a circle of radius R. The active faces of the transducer elements are directed to a point that lies on a line normal to the plane of the arc and passes through the center thereof. The radius R is equal to between 0.3 to 0.6 Rs and, preferably about 0.5 Rs, where Rs is the distance from said point to the midpoint of the arc-transducer.

An improved depth-of-field sonar system is provided where at least two arc-transducers are used having different radii, and preferably, where each radius R is equal to between 0.3 to 0.6 Rs.

7 Claims, 7 Drawing Figures

DEPTH-OF-FIELD ARC-TRANSDUCER AND SONAR SYSTEM

FIELD OF THE INVENTION

The present invention relates to side-looking sonar systems and, in particular, to an increased depth-of-field side-looking sonar system using arc-transducers.

BACKGROUND OF THE INVENTION

Arc-transducers have been found useful in many types of sonar systems where it is desirable to obtain a resolution in the near field that is better than that which can be obtained in the far field from conventional types of transducer arrays. With an unfocused array, a resolution approximately equal to the antenna size is the maximum resolution obtainable. Conventionally focused transducer arrays are capable of achieving high resolution at a specific range and in a specific direction. However, an arc-transducer has the unique capability of focusing all of its energy along a straight line thereby making such arrays useful in towed side-looking systems.

Generally, an arc transducer comprises a plurality of individual transducer elements driven in phase and positioned along a circular arc. While a plurality of individual piezoelectric elements is preferred because of the relative ease of manufacture, the arc-transducer can be fabricated as a single unit having a circular arc configuration. The energy from an arc-transducer is focused along a line that is normal to the plane in which the circular arc lies.

In side-looking sonar applications, for example, the active face of the arc-transducer has a width of approximately one wavelength and is about 100 to 1000 wavelengths in length. Typically, the active face or surface of the transducer elements is oriented so that it is directed to a point on the focal line of the transducer. In side-looking sonar applications, this direction or slant range is normally at a depression angle of about 10° to the horizontal. In side-looking sonar systems, a depression angle of about 10° achieves a large bottom range for a given slant range.

The depth-of-field is the range of depths over which satisfactory definition can be obtained in a direction parallel to the bottom and the plane in which the transducer lies. This direction is normally the direction of tow of the transducer platform. The resolution of the system, on the other hand, is established by the beam width at the maximum range. Consequently, the useful depth-of-field is the range of depths over which the beam width is substantially equal to or better than the beam width on the focal line at the maximum bottom range. In the past systems, it has been deemed desirable to increase the distance between the minimum and the maximum bottom ranges for any given pulse period and any given slant range by making the radius of the arc-transducer 10 to 20 percent of the maximum slant range.

The past practice, however, has a number of undesirable effects. One disadvantage is that a very small depth-of-field results at all ranges which means that if the vehicle containing the transducer is not at precisely the proper distance above the bottom, the bottom area is not in focus, resulting in an image obtained by the system that is of poor quality. Furthermore, objects viewed on the bottom at long ranges have very long shadows, and, at maximum range, little energy is reflected back because of small grazing angles. Finally, the system is critical to any roll of the transducer platform.

Accordingly, it is an object of the present invention to provide an arc-transducer that not only provides a large depth-of-field, but also provides a maximum search volume for a sonar system.

SUMMARY OF THE INVENTION

The present invention is addressed to an arc-transducer having increased depth-of-field and scanning volume. The arc-transducer of the present invention has a radius from 0.3 to 0.6 $R_s$ and preferably about one-half (0.5) the dimension of the maximum slant range. The increased depth-of-field is achieved for all points within the scanning volume having a resolution substantially equal to or better than the resolution or beam width at the maximum range. The resolution at points inside the effective scan volume have a resolution about equal or better (smaller) than that at maximum range. Moreover, an arc-transducer of the present invention has a scan volume per pulse within a few percent of the maximum theoretical achievable volume.

Further improvements in the depth-of-field are achieved by utilizing two or more arc-transducers having different radii, but the same beam widths. In this case, the transducers are provided with different focal distances which are selected for scanning a single bottom area together with an overlap in at least a portion of the desired field depth. Accordingly, the depth-of-field for the combination of transducers is a composite depth-of-field greater than any of the transducers singly or any combination of transducers having the same radii. The increased depth-of-field is further increased by establishing each radius equal to about one-half of the selected slant range.

Other advantages will become apparent from a perusal of the following detailed description taken in connection with the accompanying drawings.

DESCRIPTION OF THE INVENTION

Figure 1:
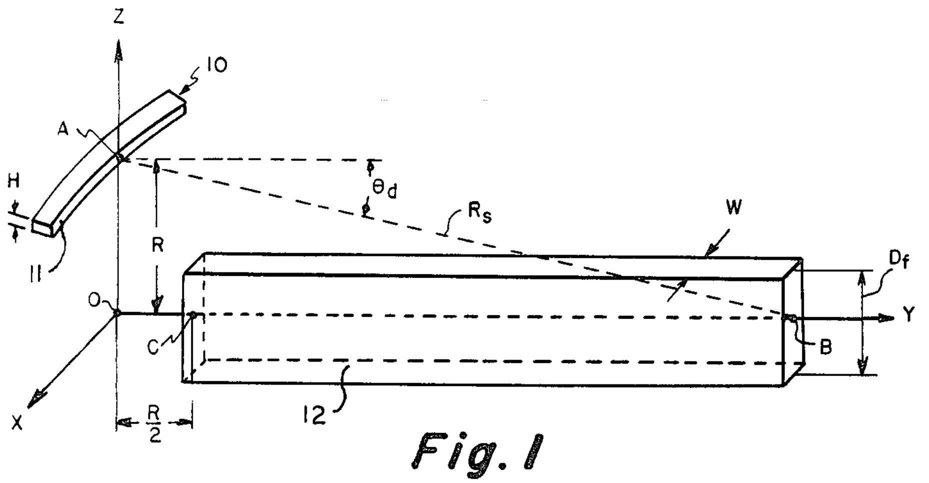
FIG. 1 is a diagrammatic view of the scan volume showing bottom range, resolution, and depth-of-field of a conventional side-looking arc-transducer.

For purposes of explaining the present invention, reference to FIG. 1 shows a conventional arc-transducer 10. Arc-transducer 10 is positioned along a circular arc of radius R lying in the X-Z plane. Energy from transducer 10 is focused along the Y axis normal to the X-Z plane. As shown in FIG. 1, face 11 of transducer 10 is oriented for use in a side-looking sonar system at a depression angle of $\theta_d$ of about 10° and directed toward point B along line Y. The scanning volume is indicated by the rectangularly bounded volume 12 having a length equal to the difference between maximum and minimum bottom ranges, point C to point B, a width W equal to the resolution at maximum range, and a height equal to the depth-of-field $D_f$. B is a point on the bottom at maximum range and $R_s$ is the slant range to that point.

Figure 2:
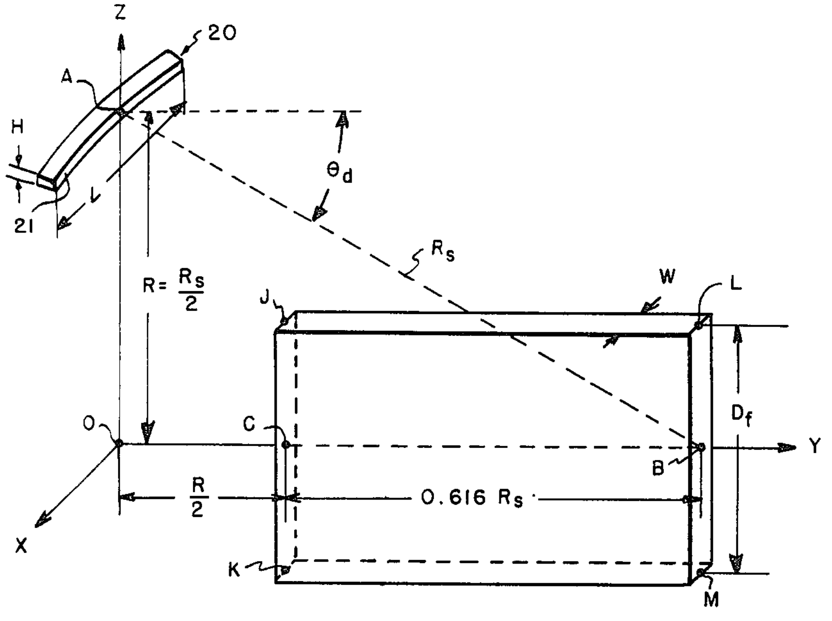
FIG. 2 is a diagrammatic view of the scan volume showing range, resolution, and depth-of-field for an arc-transducer of the present invention.

Referring to FIG. 2, an arc-transducer 20 of the present invention is shown having a radius R equal to 0.5 Rs where Rs is equal to the maximum slant range. The center of transducer 20 is located at point A and the centerline along the length of active face 21 is positioned in the X-Z plane and focused along the Y axis. The width H of the transducer face is preferably one wavelength.

Figure 4:
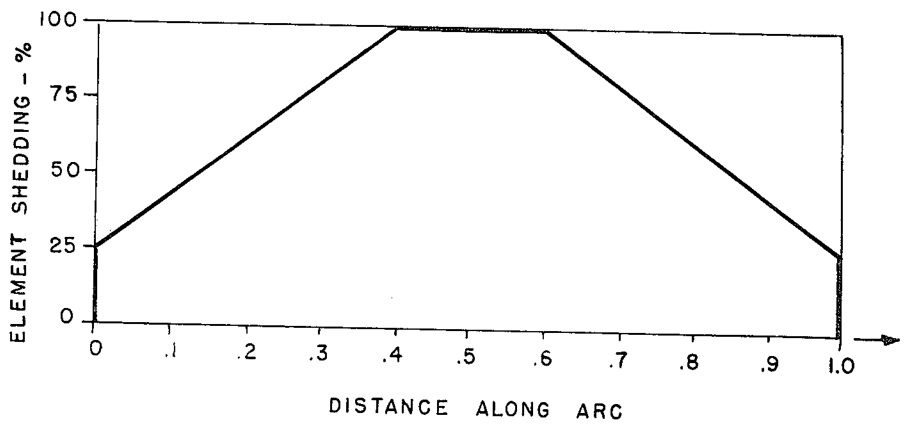
FIG. 4 is a graphical representation of a shading function for arc-transducers for providing low side lobes.

While the active face of transducer 20 may comprise a single element, it preferably comprises a plurality of small segments, the face of each being directed to point (B) at maximum range. Moreover, to obtain high quality sonar pictures, the transmitting and receiving transducer patterns should have low side lobes. Preferably a side lobe level of less than −20dB is desired. This is readily achievable by shading transducer 20 as shown in FIG. 4. Thus, in preferred arc-transducer 20, each element would have a transformer or a circuit to supply the proper voltage to that element. For example, in a projecting transducer, the relative pressures developed by each element would decrease from the center of the arc-transducer to its outer edge as shown in FIG. 4. In a receiving array the voltage gains of the outer elements would be arranged to reduce relative to the center elements as indicated in FIG. 4.

The depth-of-field, $D_f$, of an arc-transducer 10 has been found to be $$D_f = \frac{3.57\, w^2 R}{\lambda R_s}$$

Thus, for any given arc-transducer having a radius R and a slant range $R_s$, the depth-of-field depends only upon the wavelength λ, and the beam width W at point B. Accordingly, to achieve a large $D_f$ with a fixed W, the ratio $R/R_s$ would be made as large as possible. However, as R approaches $R_s$ in size, the width of the bottom search area becomes very small.

It is desirable to make the volume that is effectively searched by transducer 20 as large as possible. This volume is represented in FIG. 2 by the parallelepiped having a height $D_f$, a width $w$ and length $\overline{CB}$. The resolution at points J, K, L, and M are each the same as beam width (W) at point B. All points within the rectangle JKLM have a resolution w either substantially equal to or better than beam width W.

The volume searched per pulse is $$V = w \left(\frac{3.57\, w^2 R}{\lambda R_s}\right) [(R_s^2 - R^2)^{1/2} - 0.5R]$$

With a fixed value of $w$, λ and $R_s$, this expression has a maximum value when $$R = 0.53\, R_s$$

Accordingly, the optimum arc-transducer 20 configuration is where the arc radius is equal to 53 percent of the maximum slant range $R_s$, or approximately $R_s/2$. Thus when $R = R_s/2$, the depth-of-field $D_f$ is $$D_f = (1.78\, w^2)/\lambda$$

and the scanned volume per pulse is $$V = D_f\, w\, .616\, R_s = (1.1\, w^3 R_s)/\lambda$$

and the length of transducer 20 is $$L = (K\lambda R_s)/w,$$

where $K$ is a constant that depends upon the type of shading applied along the length of arc-transducer 20. Where no shading is utilized, it has been found that $K = 0.89$, which results in a signal having large side lobes. Accordingly, an increased depth-of-field is obtained for a radius of from about 0.3 $R_s$ to 0.6 $R_s$ and preferably about 0.5 $R_s$.

As shown in FIG. 4, a symmetrical shading function with a 75 percent reduction in voltage at the edges relative to the center of the transducer is preferred. In such a transducer system, the side lobes of the array can be reduced to at least −20dB. For an arc-transducer having a symmetrical shading function as set forth in FIG. 4, $K = 1.12$. Accordingly, the transducer length is only 12.6 percent greater than the corresponding unshaded transducer to achieve the same resolution. Other symmetrical shading functions are also suitable for use with the transducers of the invention to provide lower side lobes or higher resolution.

Figure 3:
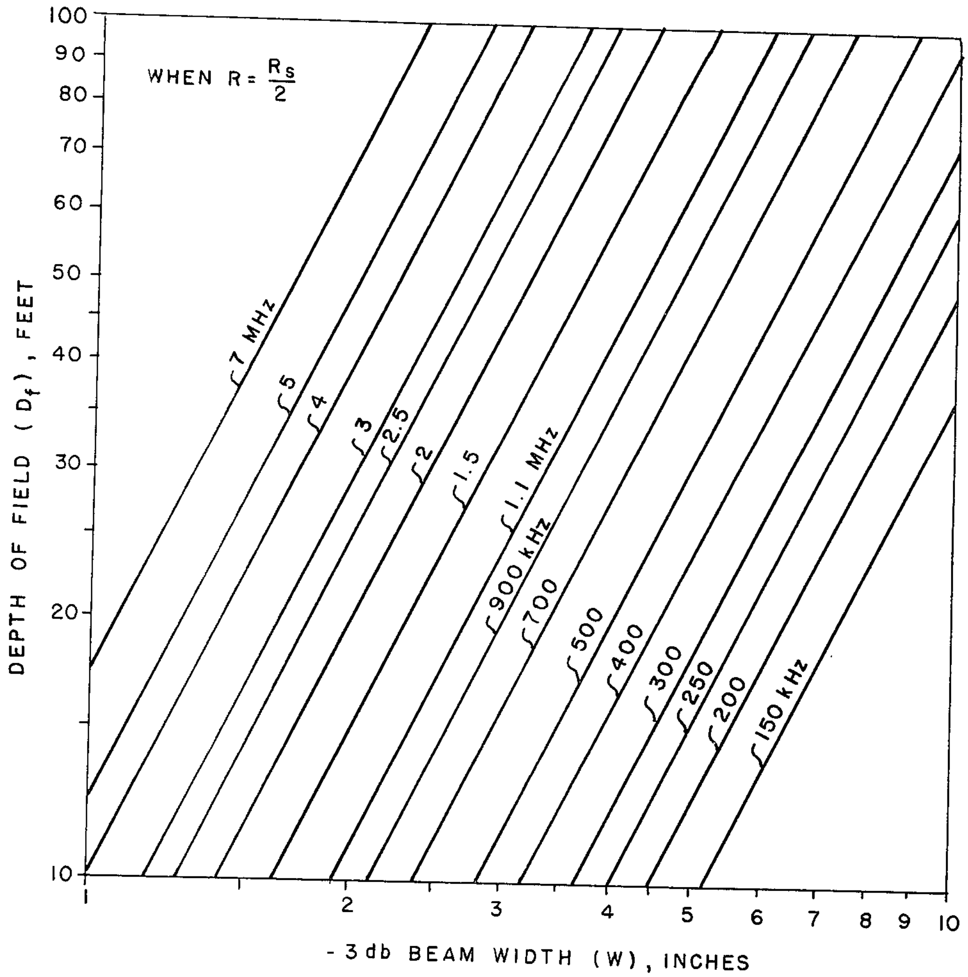
FIG. 3 is a graphical representation of depth-of-field and resolution for single arc-transducers of the present invention having frequencies from 150 KHz to 7 MHz.

With reference to FIG. 3, the best relationship between high resolution and large depth-of-field for frequencies between 150 KHz and 7 MHz can be found. For example, a 1.1 MHz system with a resolution $w = 3$ inches would have a depth-of-field, $D_f = 24$ feet. At higher resolution, e.g., 2 inches, the $D_f$ would equal 11 feet and lower resolution, e.g., 4 inches, the $D_f$ would equal 44 feet.

Figure 5:
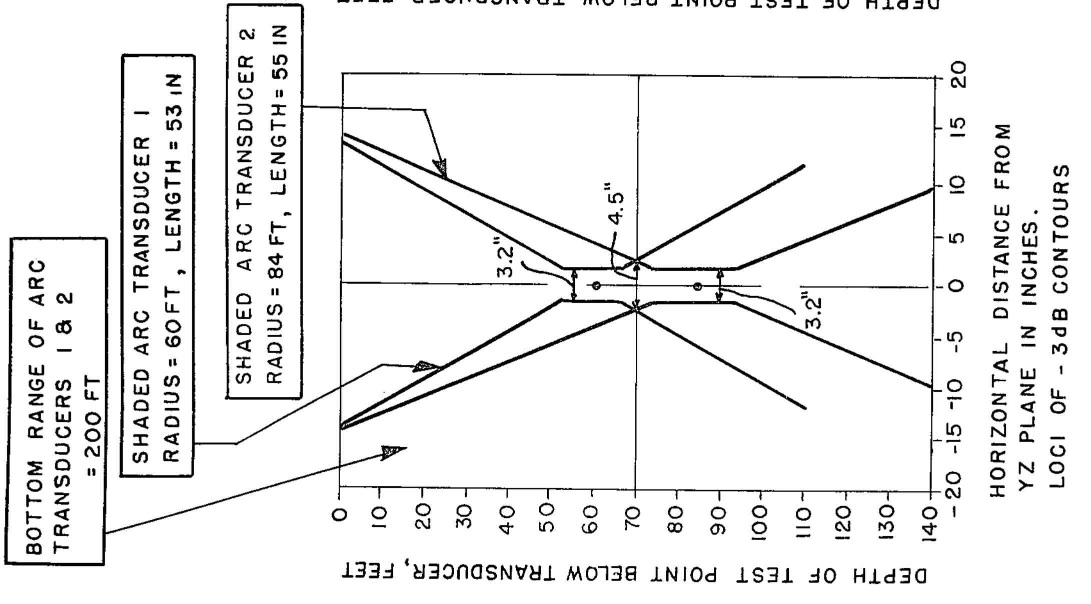
FIG. 5 is a graphical representation of the −3dB beam width or resolution as a function of depth for two arc-transducers of different radii.

With arc-transducers of the present invention, the system can tolerate a large degree of roll by the transducer platform with no degradation in resolution and only a small reduction in the depth-of-field. Moreover, the depth-of-field can be further improved or increased by using at least two arc-transducers of the present invention each having a different radius as shown in FIG. 5.

Figure 6:
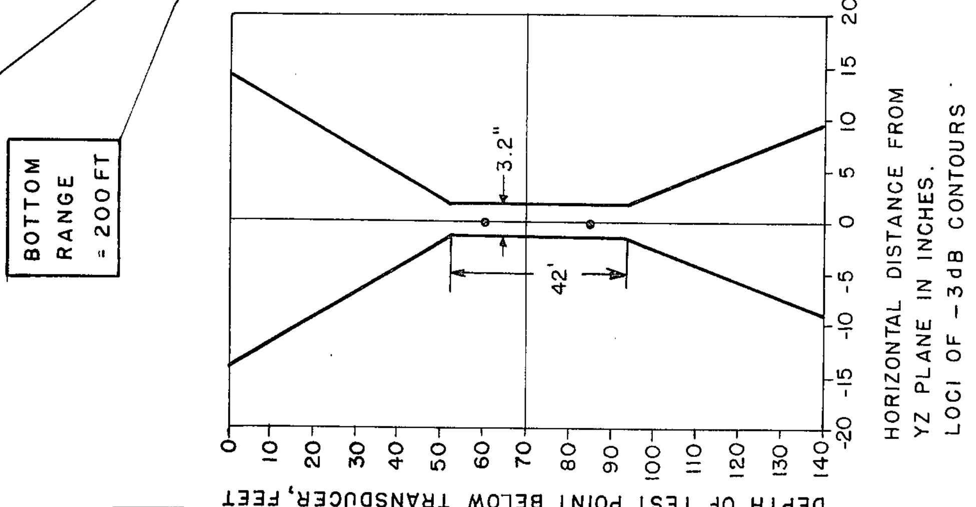
FIG. 6 is a graphical representation of the composite resolution as a function of depth of the two arc-transducers of FIG. 5.

Improvement in the depth-of-field is provided by using arc-transducers having different radii and, optionally, different lengths for transmitting and receiving. In these cases, each of the transducers is designed for the same bottom range, but the arc radius of each is different. For example, in a two arc-transducer system as shown in FIG. 5, one transducer has a length of 53 inches and a radius of 60 feet and the other transducer has a length of 55 inches and a radius of 84 feet. Their combined resolution, $w$, is 3.2 inches over a depth ($D_f$) of 42 feet as shown in FIG. 6. This is contrasted with using a pair of equal radii transducers 38 inches in length with a radius of 70 feet to achieve the same bottom range and resolution, the depth-of-field is 33 inches. In FIGS. 5 and 6, the −3dB contours are shown as a function of depth at a bottom range of 200 feet. One of the arc-transducers can be used to transmit energy and the other used to receive energy. The composite pattern (FIG. 6) is obtained by combining the individual patterns used to produce FIG. 5. Accordingly, it is preferable to utilize at least two arc-transducers of different radii to further increase the depth-of-field. The depth-of-field of the two arc-transducer systems can be further improved by making each radius R approximately one-half of the maximum slant range (i.e., $R_s/2$) of interest.

Figure 7:
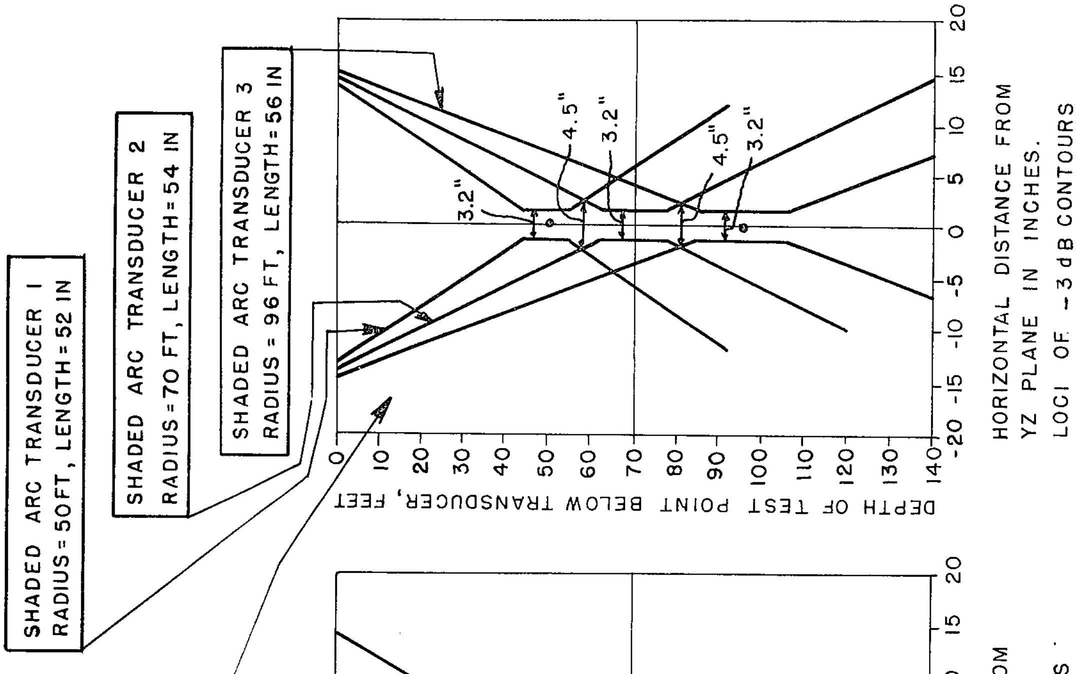
FIG. 7 is a graphical representation of the resolution as a function of depth for a sonar system having three arc-transducers of different radii.

The improvement is not limited to a system employing two arc-transducers of unequal radii, but is applicable to a plurality of unequal arc-transducers. For example, in FIG. 7 a system employing three arc-transducers of differing radii is shown. For example, in the three arc-transducer system represented in FIG. 7, a 70 foot radius unit could be used to transmit energy. At bottom depths from 44 to 70 feet a 50 foot radius transducer would be employed for reception and at depths from 70 to 107 feet a 96 foot radius transducer would be used to receive signals. As a consequence, 3.2 inch resolution would be achieved at all bottom depths from 44 to 107 feet. An alternate embodiment would be to use the 70 foot radius unit for reception and to transmit on the 50 foot radius transducer when the bottom was less than 70 feet away and transmit on the 96 foot radius transducer when the bottom depth was greater than 70 feet.

In these cases, the composite resolution of the three unequal arc-transducers would be 3.2 inches over a depth-of-field $D_f$ of 63 feet. While these systems improve the depth-of-field, they have the disadvantage over conventional usage of transducers of equal radii in that greater side lobes are obtained in the signals. As mentioned above, however, symmetrically shading the arc-transducers in a manner as set forth in FIG. 4, will substantially reduce said side lobes in the signal.

While presently preferred embodiments of the invention have been shown and described, it may be otherwise embodied within the scope of the appended claims.

What is claimed is:

1. A large depth-of-field transducer for use in sonar systems, said transducer comprising at least one transducer element positioned along an arc of a circle having a radius R and having an arc length L, said transducer element having an active face along its length including a midpoint, said face being directed toward a point lying on a line normal to the plane defined by the arc and passing through the center of said arc, said point being spaced from said midpoint by a distance $R_s$, and said radius R being equal to about 0.3 to 0.6 $R_s$.

2. A transducer as set forth in claim 1 wherein R is about 0.5 $R_s$.

3. A transducer as set forth in claim 1 wherein said transducer element comprises a plurality of individual elements adapted to be driven in phase.

4. A transducer as set forth in claim 3 for transmitting signals in sonar systems including means for feeding signals of equal phase to each of said elements, said signals having a progressively reduced amplitude from said center to said end elements.

5. An arc-transducer as set forth in claim 1 having a symmetrical shading function wherein the maximum power output of said element is from said midpoint to a distance of about 10 percent of its length on either side of said midpoint to minimum output of about 25 percent of said maximum at each of its ends.

6. A sonar system having at least two transducers as set forth in claim 1 wherein each of said transducers have transducer elements lying on the arc of a circle of a different radius R.

7. A large depth-of-field sonar transducer system, said system comprising at least two transducers, each of said transducers having at least one transducer element positioned along an arc of circle having a different radius R, said transducer element of each transducer having an active face along its length including a midpoint, each transducer face being directed to a point lying on a line normal to the plane defined by respective arc and passing through the center of its respective arc, said arcs lying in the same plane, and the radius R of each transducer is equal to between 0.3 to 0.6 $R_s$ where $R_s$ is equal to the slant range.

* * * * *